(No Model.)
I. PHILLIPS.
COMBINED KNIFE AND PEN HOLDER.
No. 296,054. Patented Apr. 1, 1884.
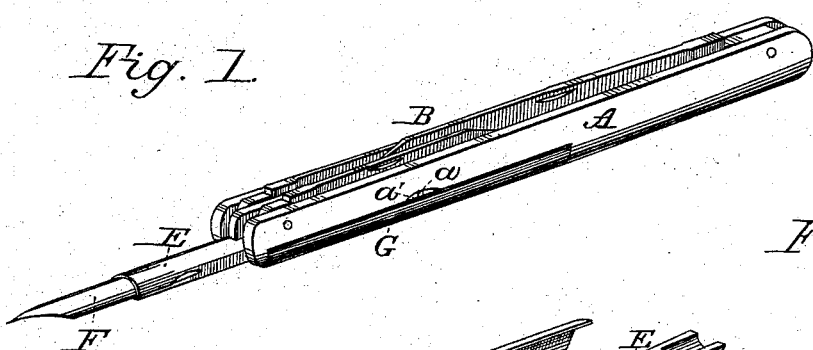
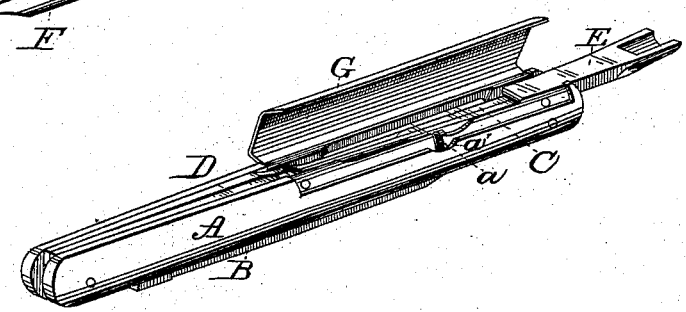
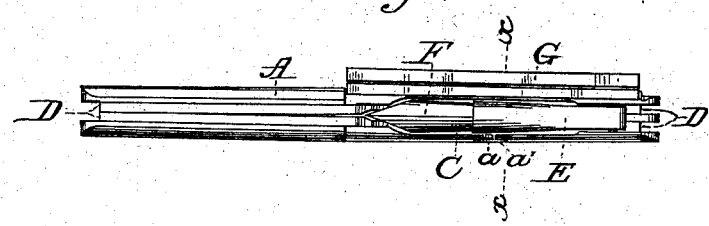
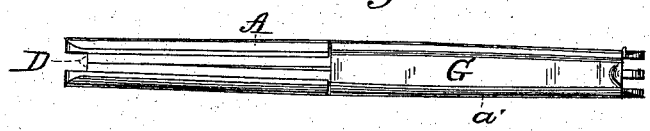
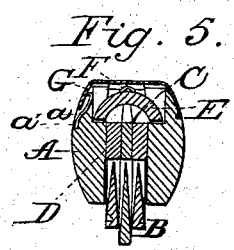
Witnesses,
Geo. H. Strong.
G. H. Strouse.
Inventor,
Isaac Phillips
By Dewey & Co.
Attorneys

UNITED STATES PATENT OFFICE.

ISAAC PHILLIPS, OF SILVER CITY, IDAHO TERRITORY.

COMBINED KNIFE AND PEN-HOLDER.

SPECIFICATION forming part of Letters Patent No. 296,054, dated April 1, 1884.

Application filed December 17, 1883. (No model.)

*To all whom it may concern:*

Be it known that I, ISAAC PHILLIPS, of Silver City, county of Owyhee, and Territory of Idaho, have invented an Improvement in Combined Knife and Pen-Holder; and I hereby declare the following to be a full, clear, and exact description thereof.

My invention relates to a new and useful combined knife and pen-holder; and it consists in an implement the handle of which is an ordinary knife-handle fitted with blades, and having in its back, near one end, a chamber, in which a short pen-holder and pen lie, the former being pivoted to the knife-handle in such manner as to enable it to be opened out with its pen, so that the handle of the knife will then form for it the staff when the implement is used for writing. A hinged casing or cover is adapted to inclose the pen and its holder when lying within the chamber, whereby dust is kept out when the implement is carried in the pocket.

The object of my invention is to provide a convenient implement capable of being used as a knife or a pen, as occasion requires.

Referring to the accompanying drawings, Figure 1 is a perspective view of my combined knife and pen-holder, showing the pen-holder extended. Fig. 2 is a view showing the underneath part of the knife uppermost with the pen-holder extended, the pen being removed. Fig. 3 is a plan showing the pen and holder folded into the chamber C. Fig. 4 is a view showing the cover G closed. Fig. 5 is an enlarged section on the line $x\ x$, Fig. 3.

A is the handle, formed as an ordinary pocket-knife handle, and fitted with blades B in the usual manner. In the back of the handle, near that end where the smaller blades are located, is formed a chamber, C, extending about half the length of the handle, and formed by cutting down or narrowing the usual back springs, D, from which the blades derive their spring in closing and remaining open, and also cutting down the partition-strip dividing the small blades when two are present, as here shown. The sides of the handle form the walls of the chamber. Pivoted between the sides, near the end, is a short pen-holder, E, having a socket of usual form adapted to receive a pen, F, which may be changed for a fresh one when necessary. Being thus pivoted, the holder and the pen are adapted to be turned down to lie in the chamber C, as shown in Fig. 3, or to be opened out, as shown in Fig. 1, when the knife-handle serves as the staff by which to grasp the implement in writing. It is necessary, however, when carrying the device in the pocket, that some provision be made for excluding the dust from the pen. Accordingly I have a curved cover, G, hinged to the side of the handle, and adapted to turn down over the pen and holder when lying in the chamber. When opened out, the cover, by closing down, holds them extended. For a neater fit, the edges of the handle are grooved or rabbeted, so that the edges of the cover may fit snugly and lie flush, when closed, with the surface of the handle. A small spring-clasp, $a$, in one edge of the handle, is adapted to engage with a notch in the cover to secure it when closed, and a small notch, $a'$, is made to admit the thumb-nail to open the cover. The usual nail-notch is made in the pen-holder for convenience in opening it.

Having thus described my invention, what I claim as new, and desire to secure by Letters Patent, is—

1. A combined knife and pen-holder, consisting of a handle provided with knife-blades, said handle having a chamber formed in its back, and a pen-holder carrying a pen pivoted in its back, and adapted to lie within said chamber and be opened out therefrom, substantially as herein described.

2. A combined knife and pen-holder, consisting of the handle A, provided with blades, the back springs, D, cut out or narrowed down near one end to form a chamber, C, the walls of which are the sides of the handle, and the pen-holder E, said pen-holder being pivoted to the back of the handle and adapted to lie within the chamber when closed, and to be opened out therefrom, substantially as herein described.

3. A combined knife and pen-holder, consisting of the handle A, fitted with blades B, said handle having a chamber, C, formed in its back near one end, the pen-holder E, adapted to carry pen F, pivoted in the back of the handle and adapted to lie in and to be opened out of said chamber, and the hinged lid or cover, G, adapted to cover said holder and pen in said chamber when closed, and to hold it when opened out, substantially as herein described.

In witness whereof I have hereunto set my hand.

ISAAC PHILLIPS.

Witnesses:
　JAMES H. WICKERSHAM,
　S. T. N. SMITH.